(12) United States Patent
Goto

(10) Patent No.: US 6,314,508 B1
(45) Date of Patent: *Nov. 6, 2001

(54) RISC TYPE MICROPROCESSOR AND INFORMATION PROCESSING APPARATUS

(75) Inventor: Masaru Goto, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/027,025

(22) Filed: Feb. 20, 1998

Related U.S. Application Data

(62) Division of application No. 08/697,796, filed on Aug. 30, 1996.

(30) Foreign Application Priority Data

Sep. 1, 1995 (JP) .................................................. 7-225036

(51) Int. Cl.[7] .................................................. G06F 15/00
(52) U.S. Cl. ................................. 712/41; 712/32; 712/34
(58) Field of Search ...................... 395/800.41, 800.32, 395/800.34; 712/41, 32, 34

(56) References Cited

U.S. PATENT DOCUMENTS

| | | |
|---|---|---|
| 4,342,082 | 7/1982 | Brown et al. . |
| 4,445,118 | 4/1984 | Taylor et al. . |
| 4,615,019 | 9/1986 | Bonci . |
| 4,851,990 * | 7/1989 | Johnson et al. ....................... 710/100 |
| 4,862,407 * | 8/1989 | Fette et al. ....................... 395/800.35 |
| 4,953,930 * | 9/1990 | Ramsey et al. ....................... 359/118 |
| 5,420,992 * | 5/1995 | Killian et al. ....................... 395/500 |
| 5,560,029 * | 9/1996 | Papadopoulos et al. ....... 395/800.25 |
| 5,659,797 * | 8/1997 | Zandveld et al. ....................... 710/22 |

FOREIGN PATENT DOCUMENTS

| | | |
|---|---|---|
| 0 042 442 | 12/1981 | (EP) . |
| 0 430 520 | 6/1991 | (EP) . |
| 586 847 | 3/1994 | (EP) . |

OTHER PUBLICATIONS

Crawford J H: *"The 1486 CPU: Executing Instructions In One Clock Cycle"* IEEE Micro, US, IEEE Inc., New York, vol. 10, No. 1, Feb. 1, 1990, pp. 27–36, XP000102436.

Alsup M: *"Motorola's 88000 Family Architecture"* IEEE Micro, US, IEEE Inc., New York, vol. 10, No. 3, Jun. 1, 1990, pp. 48–66, XP000179278.

*"Loosely Coupled Synchronization Mechanism Supporting Precise Inter–rupts"* IBM Technical Disclosure Bulletin, US, IBM, Corp., New York, vol. 35, No. 48, Sep. 1, 1992, pp. 83–86, XP000313862.

Fuccio M.L. et al.: *"Hardware Architecture Considerations In The WE32100 Chip Set"*, IEEE Micro., vol. 6, No. 2, April 1986, pp. 29–46, XP000211993.

(List continued on next page.)

*Primary Examiner*—Richard Hjerpe
*Assistant Examiner*—Mackly Monestime
(74) *Attorney, Agent, or Firm*—Frommer Lawrence & Haug LLP.; William S. Frommer; Bruno Polito

(57) ABSTRACT

A general purpose register stores a 16-bit fixed length instruction. A bypass circuit speedily outputs the result of a comparison instruction when the next conditional branch instruction is executed. An ALU performs a logic process and so forth. A high speed multiplying device/high speed dividing device performs an arithmetic operation at high speed. An address calculating portion calculates an address. An instruction decoder/pipeline controlling portion decodes an instruction and controls a pipeline. A dedicated control register is used as an interrupt stack pointer or the like. An interrupt controller performs a multiple interrupt process. A coprocessor bus is disposed independently from a data bus.

1 Claim, 10 Drawing Sheets

OTHER PUBLICATIONS

Aardoom E et al.: *"An Application Specific Processor For A Multi–System Navigation Receiver"* Proceedings of the International Conference on Computer Design; VLSI in Computers and Processors, US, Los Alamitos, IEEE Comp., Soc.Press. vol. –, Oct. 11, 1992, pp. 128–131, XP000344610.

McFarling S, Hennessy J: *"Reducing The Cost Of Branches"* The 13th Annual International Symposium on Computer Architecture; Jun.2–5, 1986, pp. 396–403, XP000212071.

Mahon M J et al.: *"Hewlett–Packard Precision Architecture: The Processor"* Hewlett–Packard Journal, US, Hewlett–Packard Co., Palo Alto, vol. 37, No. 8, Aug. 1, 1986, pp. 4–22, XP000211314.

* cited by examiner

Fig. 3

| CPU REGISTER | COP0 REGISTER | COP0 REGISTER | COP1 REGISTER | COP1 REGISTER |
|---|---|---|---|---|
| R0 | G0 SR | C0 | G0 | C0 |
| R1 ACC | G1 MCR | C1 | G1 | C1 |
| R2 | G2 IBR | C2 | G2 | C2 |
| R3 | G3 ICR | C3 | G3 | C3 |
| R4 | G4 IMR0 | C4 | G4 | C4 |
| R5 | G5 IMR1 | C5 | G5 | C5 |
| R6 | G6 JBR | C6 | G6 | C6 |
| R7 | G7 | C7 | G7 | C7 |
| R8 | G8 DAB0 | C8 | G8 | C8 |
| R9 | G9 | C9 | G9 | C9 |
| R10 | G10 | C10 | G10 | C10 |
| R11 | G11 IAB1 | C11 | G11 | C11 |
| R12 | G12 IAB2 | C12 | G12 | C12 |
| R13 | G13 | C13 | G13 | C13 |
| R14 | G14 | C14 | G14 | C14 |
| R15 | G15 | C15 | G15 | C15 |
| R16 | G16 | C16 | G16 | C16 |
| R17 | G17 | C17 | G17 | C17 |
| R18 | G18 | C18 | G18 | C18 |
| R19 | G19 | C19 | G19 | C19 |
| R20 | G20 XDDD | C20 | G20 | C20 |
| R21 | G21 | C21 | G21 | C21 |
| R22 | G22 | C22 | G22 | C22 |
| R23 | G23 | C23 | G23 | C23 |
| R24 | G24 | C24 | G24 | C24 |
| R25 | G25 | C25 | G25 | C25 |
| R26 | G26 | C26 | G26 | C26 |
| R27 | G27 | C27 | G27 | C27 |
| R28 | G28 | C28 | G28 | C28 |
| R29 | G29 | C29 | G29 | C29 |
| R30 SP | G30 | C30 | G30 | C30 |
| R31 ISP | G31 | C31 | G31 | C31 |

| H1 | L0 |
|---|---|

| VECTOR ADDRESS | OFFSET |
|---|---|
| PMI | 00H |
| NMI | 04H |
| CpU0 | 08H |
| CpU1 | 0CH |
| SYSBK | 10H |
| BK | 14H |
| DBK | 18H |
| OVF | 1CH |
| DAB0 | 20H |
| RESERVED | 24H |
| RESERVED | 28H |
| IAB0 | 2CH |
| IAB1 | 30H |
| IAB2 | 34H |
| RESERVED | 38H |
| RESERVED | 3CH |
| Exint0 | 40H |
| Exint1 | 44H |
| Exint2 | 48H |
| Exint3 | 4CH |
| Exint4 | 50H |
| Exint5 | 54H |
| Exint6 | 58H |
| Exint7 | 5CH |

RESET ADDRESS = FF60H

VECTOR ADDRESS = [IBR[15:8],VECTOR ADDRESS OFFSET]
          IBR[15:8],= FFH(INITIAL VALUE)

RISC TYPE MICROPROCESSOR AND INFORMATION PROCESSING APPARATUS

CONTINUING APPLICATION

This is a Divisional of prior application Ser. No. 08/697,796, filed Aug. 30, 1996.

BACKGROUND OF THE INVENTION

1. Field of the Invention

The present invention relates to a RISC type microprocessor and an information processing apparatus, in particular, to a RISC type microprocessor of which RISC technologies are applied for a conventional one-chip microcomputer so as to execute an interrupt process and a numeric operation at high speed and an information processing apparatus having the RISC type microprocessor.

2. Description of the Prior Art

Conventional RISCs (Reduced Instruction Set Computers) have been developed as engines for computers mainly to increase the speed of arithmetic operations. The instruction length of the RISCs is normally 32 bits, fixed.

In a one-chip microcomputer integrated with a RISC, since the code efficiency is low, the interrupt process is performed by another chip. Thus, the speed of the interrupt process is low. On the other hand, with a conventional one-chip microcomputer, arithmetic operations cannot be performed at high speed.

OBJECTS AND SUMMARY OF THE INVENTION

The present invention is made from the above-described point of view- The RISC technologies are employed for a one-chip microcomputer so as to perform both the interrupt process and the arithmetic operations at high speed.

According to a first embodiment of the invention, the RISC type microprocessor comprises a decoding means for decoding a predetermined fixed-length instruction.

The fixed-length instruction is decoded by a decoding means. Thus, the decoding process for an instruction can be performed at high speed.

According to a second embodiment of the invention, the RISC type microprocessor comprises a mode allocating means for allocating a first mode for cyclically executing processes corresponding to a plurality of interrupts at predetermined intervals or a second mode for successively executing the processes corresponding to the interrupts, and an interrupt controlling means for controlling the interrupts corresponding to the mode allocated by the mode allocating means.

In the second embodiment of the invention, the RISC type microprocessor is operable to implement a first mode for cyclically executing processes corresponding to a plurality of interrupts at predetermined intervals or a second mode for successively executing the processes corresponding to the interrupts is allocated by a mode allocating means. The interrupt process is controlled by an interrupt controlling means corresponding to the mode allocated by the mode allocating means. Thus, the interrupt process can be effectively executed.

According to a third embodiment of the invention, the one-chip microcomputer comprises a transferring means provided independently from a data bus of the RISC type microprocessor, dedicatedly used by the coprocessor, and adapted for transferring data.

In the third embodiment of the invention, the one-chip microcomputer includes a transferring means is provided independently from a data bus of the RISC type microprocessor. The transferring means is dedicatedly used by the coprocessor and adapted for transferring data. Thus, the coprocessor can transfer data independently from the RISC type microprocessor.

A fourth embodiment of the invention has a receiving unit for receiving a radio wave from a GPS satellite and a RISC type microprocessor for processing a signal corresponding to the radio wave received by the receiving unit, wherein the receiving unit for receiving the radio wave from the GPS satellite and the RISC type microprocessor for processing the signal corresponding to the radio wave are integrated in one chip.

In the fourth embodiment of the invention a receiving unit that receives the radio wave from a GPS satellite and a RISC type microprocessor that processes the signal corresponding to the radio wave are integrated in one chip. Thus, the size of the apparatus can be reduced.

The above, and other, objects, features and advantage of the present invention will become readily apparent from the following detailed description thereof which is to be read in connection with the accompanying drawings.

BRIEF DESCRIPTION OF THE DRAWINGS

FIG. 3 is a schematic diagram showing a structure of registers of the one-chip microcomputer shown in FIG. 1;

DETAILED DESCRIPTION OF THE PREFERRED EMBODIMENTS

Figure 1:
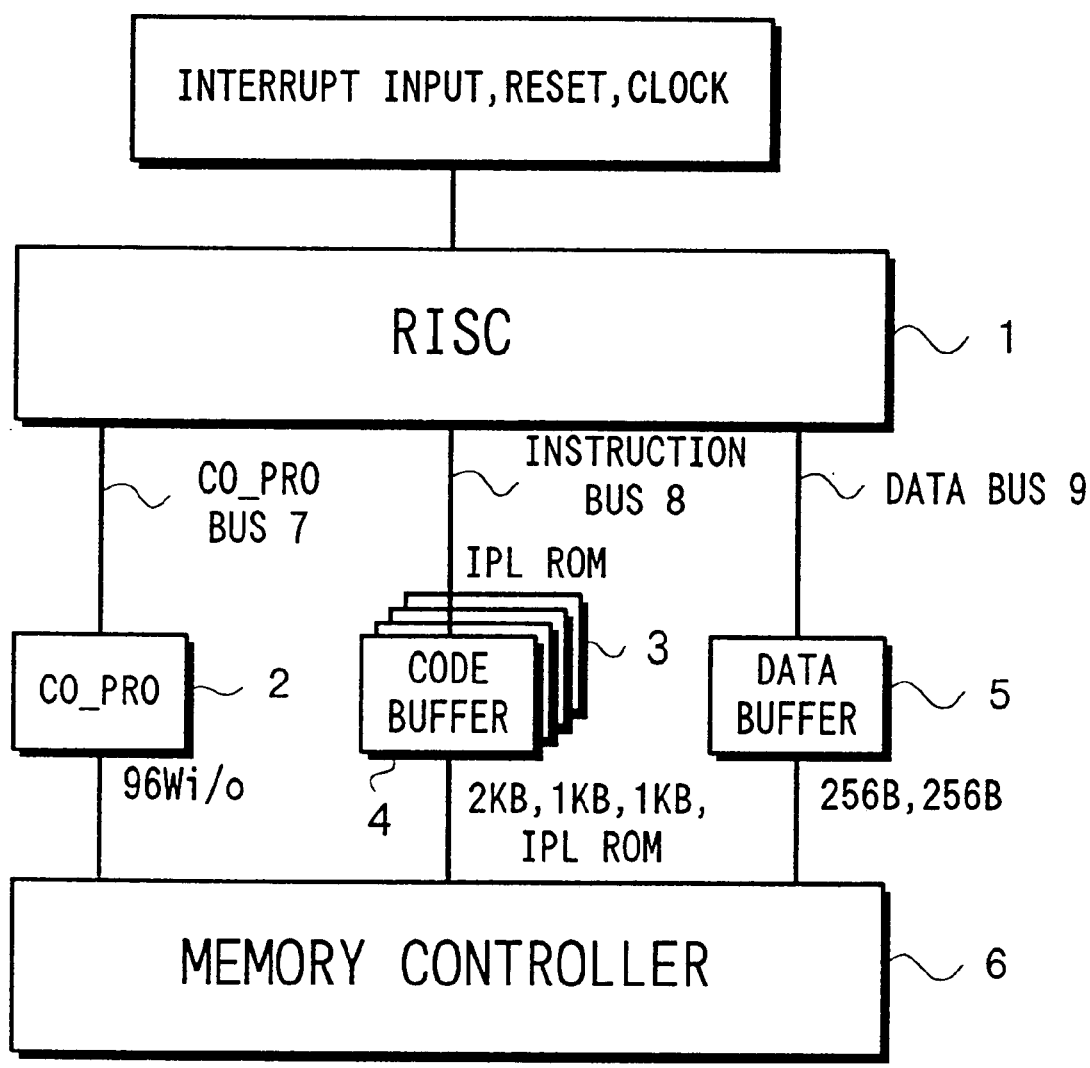
FIG. 1 is a block diagram showing a structure of a one-chip microcomputer as an application of a RISC type microprocessor according to an embodiment of the present invention.

FIG. 1 shows a structure of a one-chip microcomputer as an application of a RISC type microprocessor according to an embodiment of the present invention. A RISC (Reduced Instruction Set Computer) 1 that composes the one-chip microcomputer can input eight external interrupts, a non-maskable interrupt nmi, and a power management interrupt pmi. In addition, the RISC 1 can input a reset signal and a clock signal from the outside.

When the reset signal is input to the RISC 1, it executes a program stored in an IPL (Initial Program Loader)-ROM 3. When this program is executed, a memory controller 6 gets started through a register of a coprocessor (co_pro) 2. Thus, an operating system is loaded from an auxiliary storing unit (not shown) to a code buffer 4, a data buffer 5, and a main memory (not shown).

Figure 2:
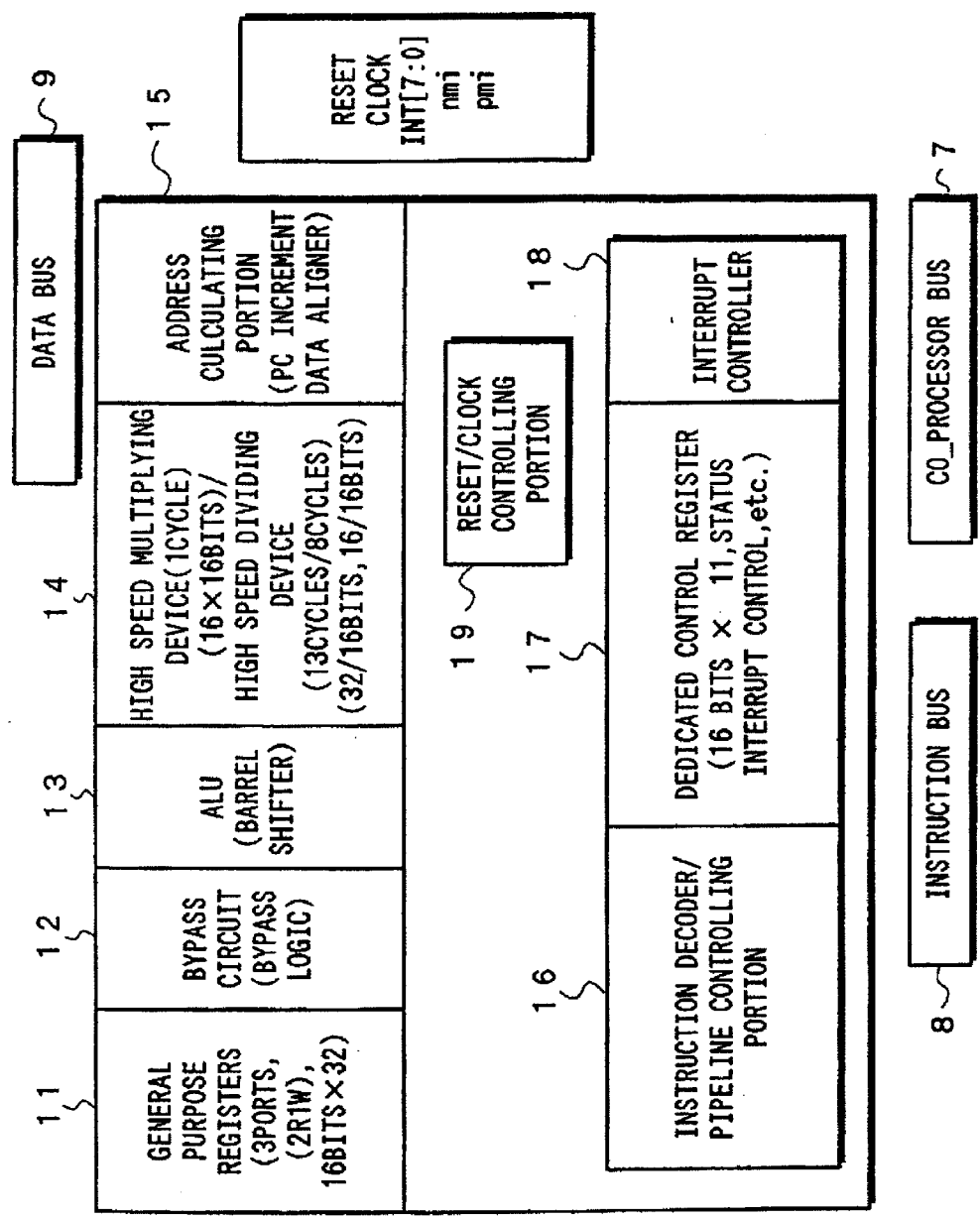
FIG. 2 is a schematic diagram showing an internal structure of the RISC 1 shown in FIG. 1.

FIG. 2 shows an example of the structure of the RISC 1 shown in FIG. 1. In the RISC 1, 32 16-bit fixed-length general purpose registers 11 are provided. A bypass circuit 12 (information supplying means) causes flag information corresponding to the executed result of a comparison instruction to be immediately used in the next conditional branch instruction.

An ALU (Arithmetic and Logic Unit) 13 is composed of a barrel shifter or the like. The ALU 13 performs a predetermined logic operation and an arithmetic operation. A high speed multiplying device/high speed dividing device 14 executes a multiplying process for multiplying 16-bit data by 16-bit data in one cycle, a dividing process for dividing 32-bit data by 16-bit data in 13 cycles, and a dividing process for dividing 16-bit data by 16-bit data in eight cycles.

An address calculating portion 15 calculates an address with a program counter or the like. An instruction decoder/pipeline controlling portion 16 (decoding means) interprets for example a 16-bit fixed length instruction read from the memory and performs a pipeline process with a five-staged pipeline.

11 16-bit dedicated control registers 17 (mode allocating means) are provided. The dedicated control registers 17 store status information (flag information), interrupt control information, and so forth. An interrupt controller 18 controls an interrupt process corresponding to the interrupt control information stored in the dedicated control register 17. A reset/clock controlling portion 19 generates a reset signal and a clock signal and supplies these signals to each portion of the RISC 1.

FIG. 3 shows a register map of the one-chip microcomputer shown in FIG. 1. In this case, two coprocessor (COP0 and COP1) are extensionally used. The RISC (CPU) 1 has 32 general purpose registers. 32 control registers of the first coprocessor (COP0) 2 are used (mapped) as internal control registers for the CPU. Thus, the user can use only the remaining 32 control registers. In addition, the user can use 64 control registers of the second coprocessor (COP1) (not shown) without any restriction.

The general purpose registers can be used as registers for arithmetic operations other than special instructions. A register ACC (R1) can be used for an immediate operand and an operand in a bit process. As an exception, a register SP (R30) can be used as a stack pointer for a "RET" instruction. A register ISP (R31) can be used as a stack pointer for an interrupt process, an exception process, and a "RETI" instruction. The initial values of these general purpose registers (including the register ACC, the register SP, and the register ISP) are undefined.

As shown in FIG. 3, a total of 128 registers of registers G31 to G0 and C31 to C0 of the first coprocessor (COP0) 2 and registers G31 to G0 and C31 to C0 of the second coprocessor (COP1) can be extensionally used. Data transfer among the registers of the coprocessors, the general purpose registers, and the memory is defined by instructions.

A total of 96 registers of the registers C31 to C0 of the first coprocessor and the registers G31 to G0 and C31 to C0 of the second coprocessor can be used as external extension registers. 11 of the registers G31 to G0 of the first coprocessor function as control registers for the CPU. The remaining 21 registers are reserved for further extensions.

An SR (Status Register) stores a flag corresponding to the result of an arithmetic operation or the like. An MCR (Machine Control Register) is used for a machine control. For example, data that allocates 32-bit divisions is stored in the MCR. An IBR (Interrupt Base Register) stores the base address of an interrupt vector table. A JBR (Jump Base Register) is used when a special jump instruction is executed and a branch is performed. An ICR (Interrupt Control Register) is used for an interrupt control. The ICR structures a three-level interrupt stack.

An IMR0 (Interrupt Mode Register 0) is used for an external interrupt mode control. For example, a "round robin" mode or "fixed" mode (that will be described later) is set to the IMR0. An IMR1 (Interrupt Mode Register 1) is used for categorizing eight external interrupts as groups. A DAB0 (Data Address Break 0) is used for storing a break address of a data buffer. An IAB1 (Instruction Address Break 1) is used for storing a break address of an instruction buffer. An IAB2 (Instruction Address Break 2), is used for storing a break address of an instruction buffer. An XDDD (Extended Divide Divident) is used for storing high order 16 bits of a 32-bit divident when an extended division instruction is executed.

Each of the first coprocessor and the second coprocessor has around 30 operation codes that the user can extensionally use. These operation codes can be easily executed by a "DW" instruction of the assembler. The CPU supports an exception process of which the coprocessors are not used. The hardware of the coprocessors can be simulated by software.

Figure 4:
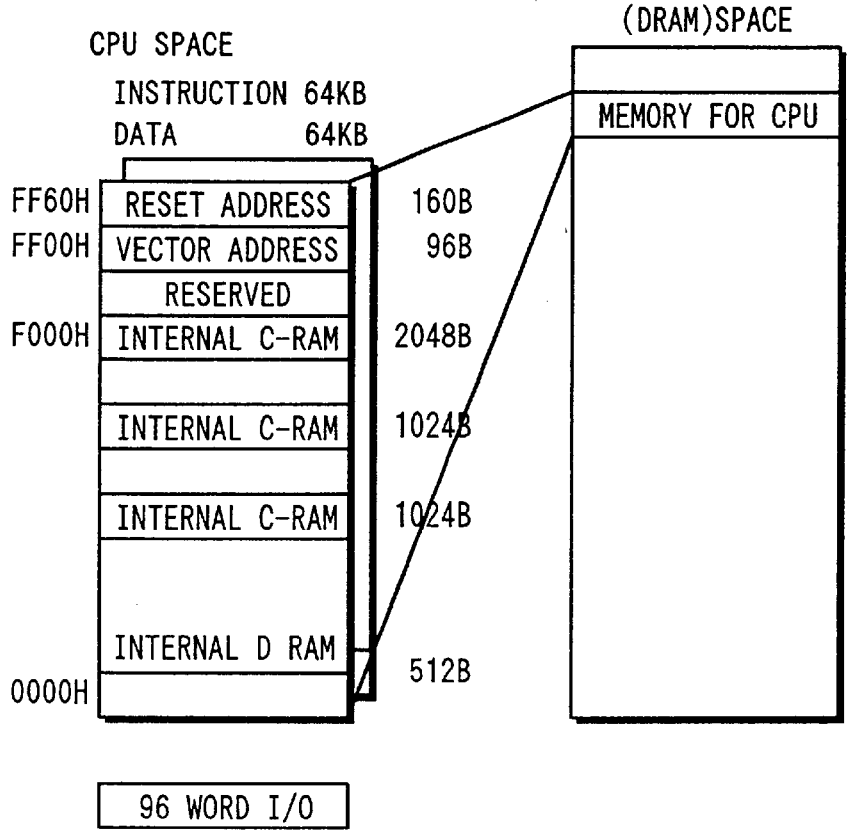
FIG. 4 is a schematic diagram showing an address space of the RISC 1.

FIG. 4 shows an example of the structure of an address space of the RISC 1. 64 Kbytes can be used for each of instructions and data. To exchange data between the RISC 1 and the external coprocessors, a 96-word external register can be used. When the RISC 1 receives an external reset, the control branches to FF60H and executes an instruction stored therein. Vector addresses are allocated every two words (four bytes). At the first word, a branch (jump) instruction is set. At the second word that is a delay slot, a "nop (no operation)" instruction or another instruction is set.

The base address of the vector address is the value stored in the register IBR (high order eight bits). The vector address can be set at any location of 256 bytes. An offset value to be branched is set at the vector address. Corresponding to the offset value and the base address stored in the register IBR (for example, by ORing them), the address to be branched is obtained.

Figure 5A:
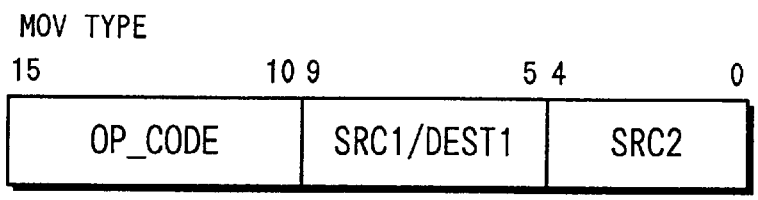
FIGS. 5A to 5G are schematic diagrams showing formats of instructions used in the RISC 1.

FIGS. 5A to 5G show examples of formats of instructions used in the one-chip microcomputer shown in FIG. 1. FIG. 5A shows the format of an MOV instruction. The length of the instruction is 16 bits fixed. This format is of two-operand type composed of an operation code (OP_CODE) and two operands (SRC1/DEST1, SRC2). Since the instruction length is 16 bits fixed, the code efficiency can be improved.

Figure 5B:
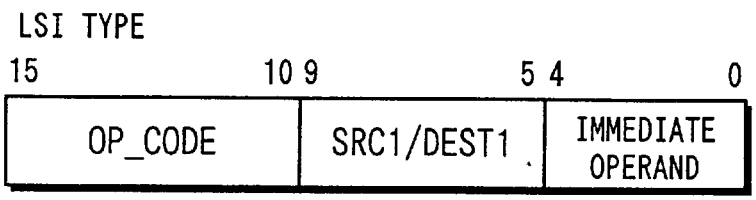
Figure 5C:
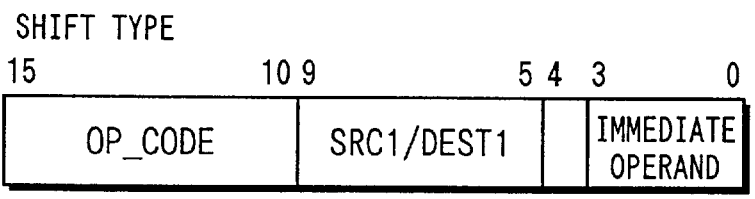
Figure 5D:
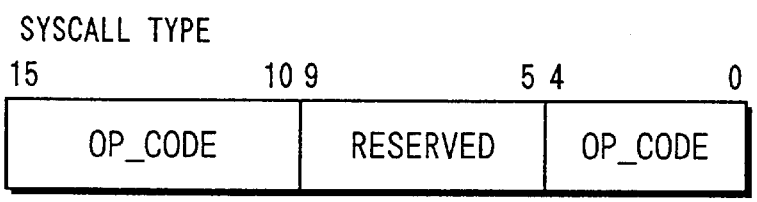
Figure 5E:
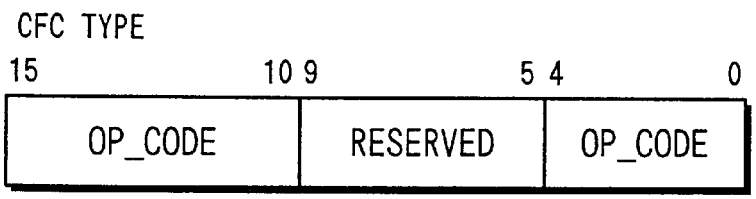
Figure 5F:
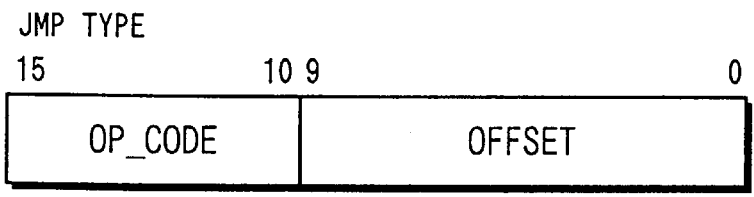
Figure 5G:
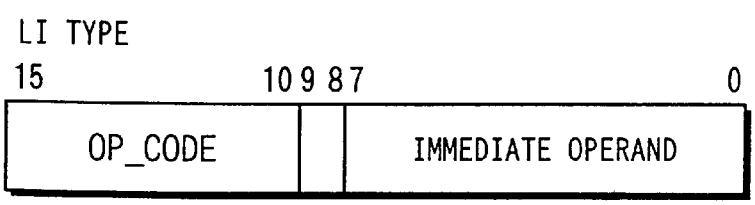

FIG. 5B shows the format of a LSI type (immediate instruction). FIG. 5C shows the format of a SHIFT type (shift instruction). FIG. 5D shows the format of a SYSCALL type (branch instruction). FIG. 5E shows the format of a CFC type (coprocessor transfer instruction). FIG. 5F shows the format of a JMP type (branch instruction). FIG. 5G shows the format of an LI type (immediate instruction).

In addition, a bit process instruction is provided. With the bit process instruction, for example, a bit inverting process can be easily performed. Thus, when the one-chip microcomputer is used as a controller, the process can be effectively performed. Moreover, with the above-described immediate instruction, the code efficiency can be further improved.

Figure 6:
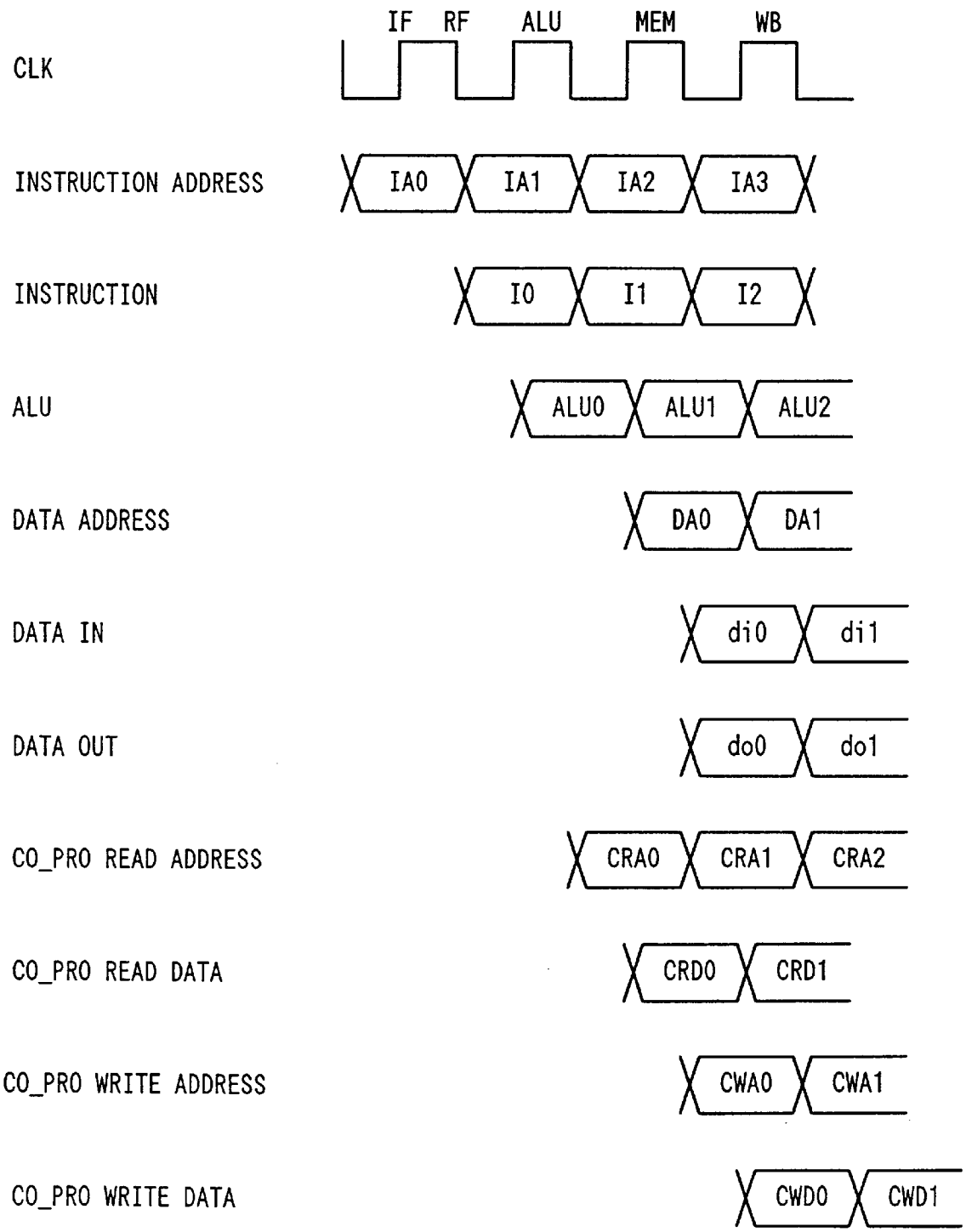
FIG. 6 is a schematic diagram showing a pipeline operation of an instruction decoder/pipeline controlling portion 16.

FIG. 6 shows operations of a five-staged pipeline, an instruction bus 8, a data bus 9, and a coprocessor bus 7 (transfer means). As shown in FIG. 1, the instruction bus 8, the data bus 9, and the coprocessor bus 7 are independently structured. In addition, data input/output of these buses is independently performed. Each bus is connected by an external cache (buffer) and a register of the coprocessor 2.

When the bus width is 16 bits, even if such buses are independently structured, the total bus width is not large. Thus, as described above, the coprocessor bus 7 can be separated from the data bus so as to remove the restrictions of the extended coprocessors. Since the coprocessor bus 7 is separated from the data bus 9, as shown in FIG. 6, a load process or a store process of the coprocessor 2 can be performed independently from a conventional load process or a store process of the RISC 1. Thus, the coprocessor 2 can be released from a critical path. Consequently, the coprocessor 2 can freely use the bus (coprocessor bus 7).

The instruction decoder/pipeline controlling portion 16 determines whether an instruction latched on the instruction bus 8 is issued to the RISC 1 or the coprocessor 2 when the signal level of the clock signal supplied from the reset/clock controlling portion 19 becomes low. When the instruction is issued to the RISC 1, the RISC 1 executes the instruction. When the instruction is issued to the coprocessor 2, the operation corresponding to the instruction is performed by the hardware of the coprocessor 2. At this point, the RISC 1 does not perform any process.

Figure 7:
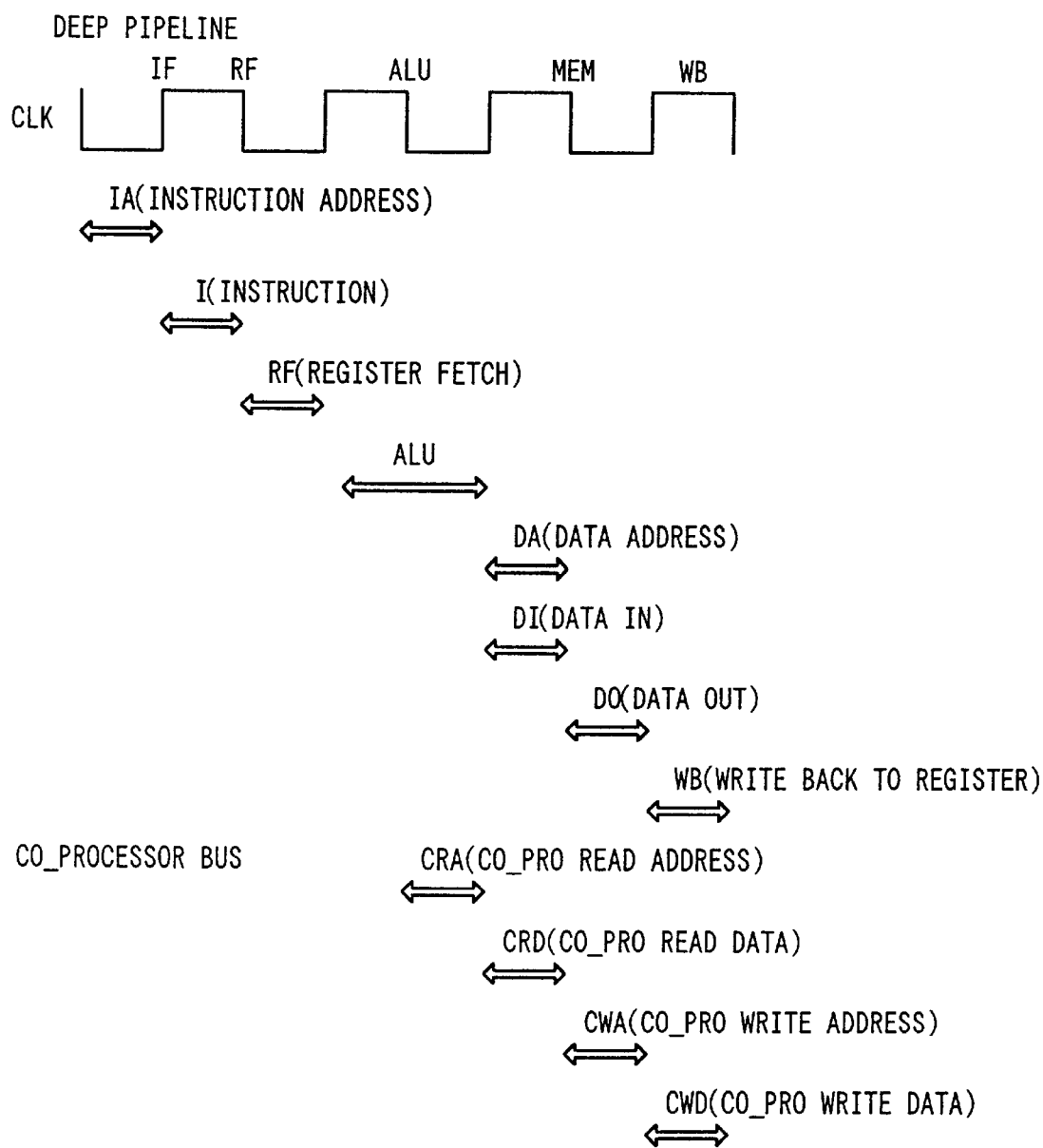
FIG. 7 is a schematic diagram showing an operation of a coprocessor bus 7.

FIG. 7 shows timings of which individual buses can be used after an instruction is decoded. Thus, the coprocessor 2 can freely use the coprocessor bus 7.

In addition, as the coprocessor 2, the first coprocessor (COP0) and the second coprocessor (COP1) can be extensionally used. With a RISC instruction, data can be transferred between the coprocessors and the general purpose registers and between the coprocessors and the memory.

In the 16-bit fixed length RISC processor, to effectively process an interrupt without stopping the five-staged pipeline, a jump instruction table is preferably used instead of a so-called interrupt vector table. In the address space shown in FIG. 4, as described above, vector addresses are set every four bytes. A 96-byte movable instruction table is formed. In the table, 24 exceptions can be defined. One exception is defined with four bytes. In two bytes (one word) of the four bytes, a jump instruction is set. The remaining two bytes (one word) are used as a delay slot. In the delay slot, a no-operation instruction or another instruction is set.

As shown in FIG. 4, only three instruction exceptions, seven internal exceptions, two non-maskable interrupts, and eight external interrupts are defined. These exceptions and interrupts can be effectively controlled.

In addition, external interrupts can be defined as follows. In other words, the eight external interrupts can be allocated the "round robin" mode or the "fixed" mode. In the "round robin" mode, when the initial value is set to 0, the interrupts are cyclically processed in the order of interrupt numbers 0, 1, 2, ..., 7, 0, ... and so forth at predetermined intervals. In this mode, when the initial value is set to 1, the interrupts are cyclically processed in the order of the interrupt numbers 1, 2, 3, ..., 7, 0, 1, ... and so forth at the predetermined intervals.

In the "fixed" mode, when the initial value is set to 0, the interrupts are successively processed in the order of the interrupt numbers 0, 1, 2, ..., and 7. In this mode, when the initial value is set to 1, the interrupts are successively processed in the order of the interrupt numbers 1, 2, 3, ..., 7, and 0.

Alternatively, the eight external interrupts can be categorized as two groups of "high" and "low". In each of the "high" group and the "low" group, the eight interrupts can be allocated priority. At this point, in the "high" group or the "glow" group, the "round robin" mode or the "fixed" mode can be independently allocated.

In the case that the "round robin" mode is allocated to the four external interrupts in the "high" group, when the initial value is set to 4, the interrupts are cyclically processed in the order of the interrupt numbers 4, 5, 6, 7, 4, 5, ... and so forth at the predetermined intervals. In this case, when the initial value is set to 5, the interrupts are cyclically processed in the order of the interrupt numbers 5, 6, 7, 4, 5, 6, ... and so forth at the predetermined intervals.

In the case that the "fixed" mode is allocated to the four external interrupts in the "high" group, when the initial value is set to 4, the interrupts are successively processed in the order of the interrupt numbers 4, 5, 6, and 7. In this case, when the initial value is set to 5, the interrupts are successively processed in the order of the interrupt numbers 5, 6, 7, and 4.

In the case that the "round robin" mode is allocated to the four external interrupts in the "low" group, when the initial value is set to 0, the interrupts are cyclically processed in the order of the interrupt numbers 0, 1, 2, 3, 0, ... and so forth at the predetermined intervals. In this case, when the initial value is set to 1, the interrupts are cyclically processed in the order of the interrupt numbers 1, 2, 3, 0, 1, ... and so forth at the predetermined intervals.

In the case that the "fixed" mode is allocated to the four external interrupts in the "glow" group, when the initial value is set to 0, the interrupts are successively processed in the order of the interrupt numbers 0, 1, 2, and 3. In this case, when the initial value is set to 1, the interrupts are successively processed in the order of the interrupt numbers 1, 2, 3, and 0.

When an interrupt process is executed with the register R31 as the ISP (Interrupt Stack Pointer) as shown in FIG. 3, interrupts can be managed in multiple levels. In other words, when an interrupt takes place, the PC (Program Counter) is saved to a stack so as to prohibit an external interrupt. Thus, the interrupt process can be performed at high speed. In addition, a support circuit for a RETI (Return Interrupt) instruction and three-leveled interrupts is provided. In other words, a three-leveled interrupt stack is provided. For example, regions of several bits are formed in the register G3 (ICR) of the COP0 shown in FIG. 3. With these regions, the three-leveled interrupt stack is formed. Whenever an interrupt is executed, the values of these regions are shifted.

In a 32-bit fixed length RISC, a conventional conditional branch instruction is executed as one instruction. In a classic CISC, after a comparison instruction is executed, a conditional branch instruction is executed. Thus, the execution time of the comparison instruction and the conditional branch instruction is remarkably long. This is because the conditional branch is performed with a defined value in the flag register corresponding to the compared result of the comparison instruction.

On the other hand, in a 16-bit fixed length RISC, since the instruction length is short, a conditional branch instruction cannot be executed as one instruction. Thus, after the comparison instruction is executed, the branch instruction is executed.

The 16-bit fixed length RISC 1 is composed of a five-staged pipeline. When a defined value in the flag register is used, after the comparison instruction is executed, until the conditional branch instruction is executed, a pipeline delay takes place. To prevent the pipeline delay, a flag corresponding to the result of the comparison instruction is generated by the bypass circuit 12 so that the result of the comparison instruction can be immediately used for the branch instruction. Thus, the conditional branch operation can be performed at high speed.

Figure 8:
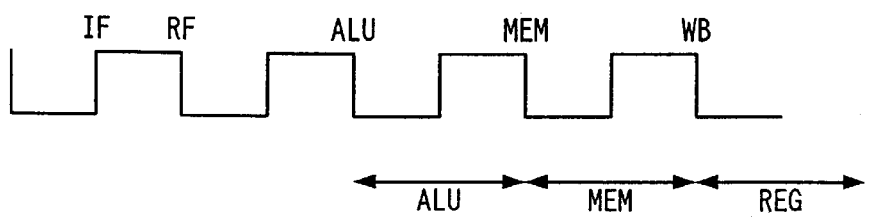
FIG. 8 is a schematic diagram showing a structure of a pipeline.
Figure 9A:
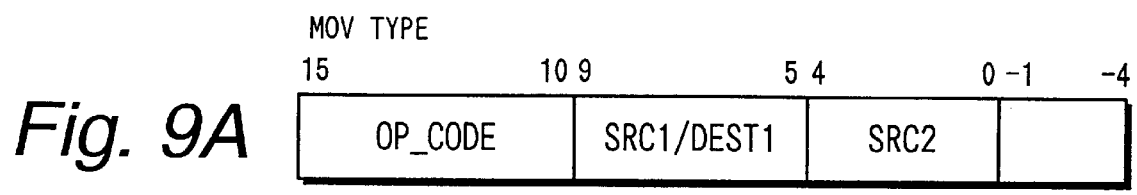
FIGS. 9A to 9G are schematic diagrams showing formats of microcodes.
Figure 9B:
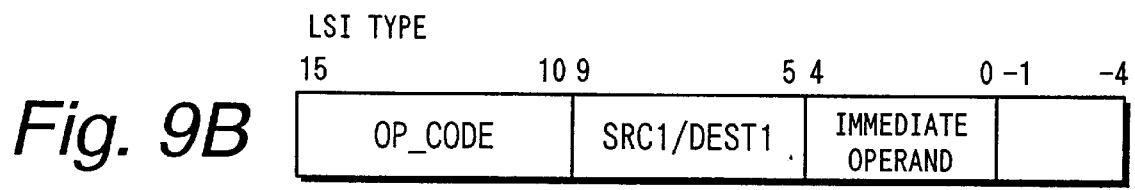
Figure 9C:
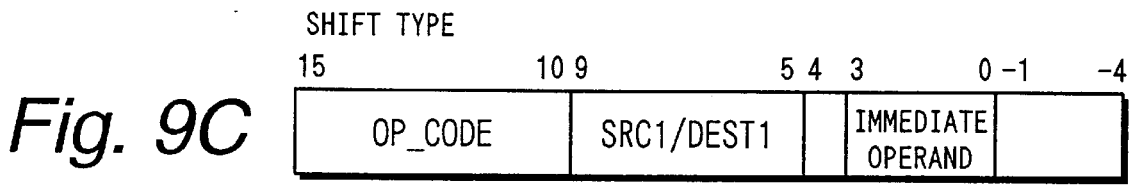
Figure 9D:
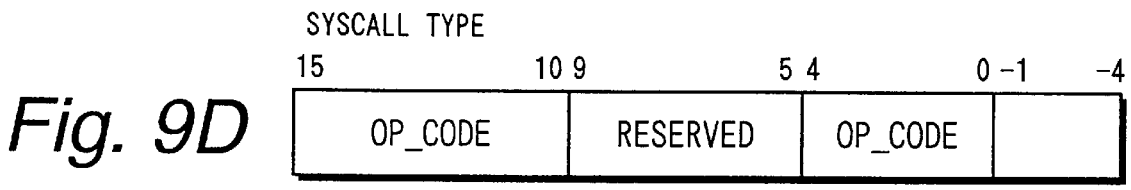
Figure 9E:
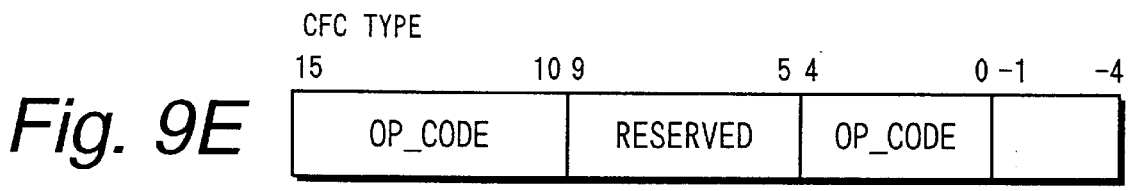
Figure 9F:
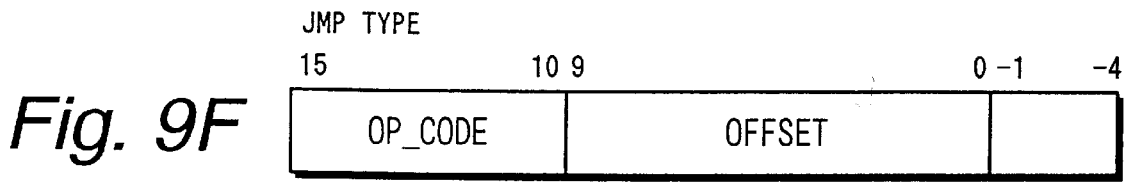
Figure 9G:
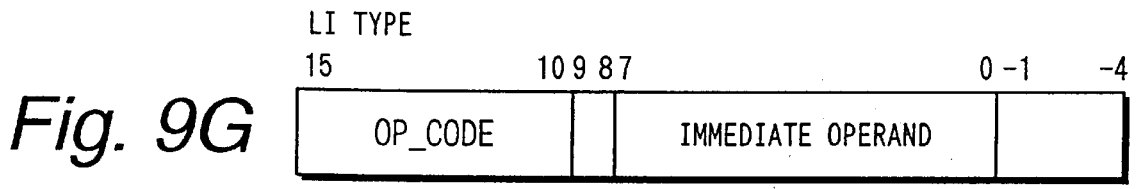

FIG. 8 shows the structure of a five-staged pipeline. As shown in FIG. 8, the five-staged pipeline is composed of an IF (instruction fetch) stage, an RF (register fetch) stage, an ALU (arithmetic operation) stage, an MEM (memory transfer) stage, and a WB (register write back) stage. When the conditional branch instruction is executed, the latest updated flag of the pipeline of which the value in the flag register is not defined is used. The flag is supplied from the above-described bypass circuit. When the ALU is executed, it is determined whether or not the latest flag is valid. When the latest flag is valid, the result is read. When the MEM is executed, if the latest flag is valid, data that has been loaded or stored is used. In such a manner, in each stage of the pipeline, it is determined whether the flag is valid.

FIGS. 9A to 9G show examples of formats of microcodes as an application of the formats of 16-bit fixed length instructions. Generally, microcodes are copyright protected, whereas binary codes of CPU instructions are not copyright protected. However, in the case of the RISC, since instruction scheme thereof is formats of microcodes. Thus, when several bits (for example, four bits) are added to an instruction of the RISC and used for multiple purposes, complete formats of microcodes are obtained. The bits 15 to 0 of the 16-bit fixed instructions are instruction scheme of the RISC.

By adding several bits (bit −1 to −4) to a 16-bit fixed length instruction, the hardware connected to the CPU (RISC) 1 can be controlled for multiple purposes. Thus, the instructions of the RISC can be used as microcodes with a bit length of 17 bits to 20 bits.

To accomplish a complicated RISC instruction set, a PLA (Programmable Logic Array) or the like may be used. However, normally, microcodes are used. The formats of the microcodes allow the data bus to effectively work. On the other hand, the instruction scheme of the RISC is composed of fixed length instructions, it can be treated as formats of microcodes. By slightly modifying the instruction scheme of the RISC, a complicated CISC instruction set can be accomplished. In other words, the instruction scheme of the RISC allows the data bus to effectively work.

Figure 10:
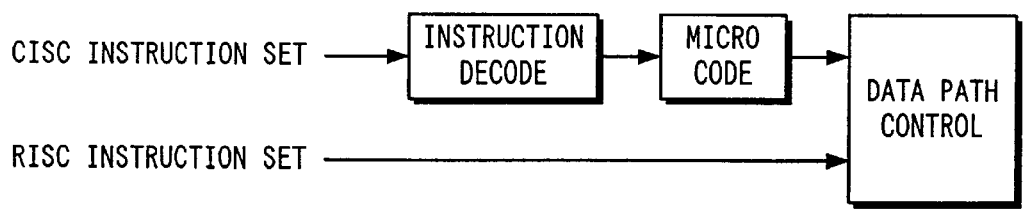
FIG. 10 is a schematic diagram for explaining the difference of the controlling method of the data bus between a CISC instruction set and a RISC instruction set.

Thus, as shown in FIG. 10, with the RISC instruction set, the data bus can be directly controlled. On the other hand, in the case of the CISC instruction set, an instruction is analyzed. Next, the top address of a microcode is calculated. The calculated address is supplied to a predetermined microcode and then executed. In the microcode format, several bits added to the RISC instruction set are for example an instruction end bit. In such a manner, the data bus is controlled.

Figure 11:
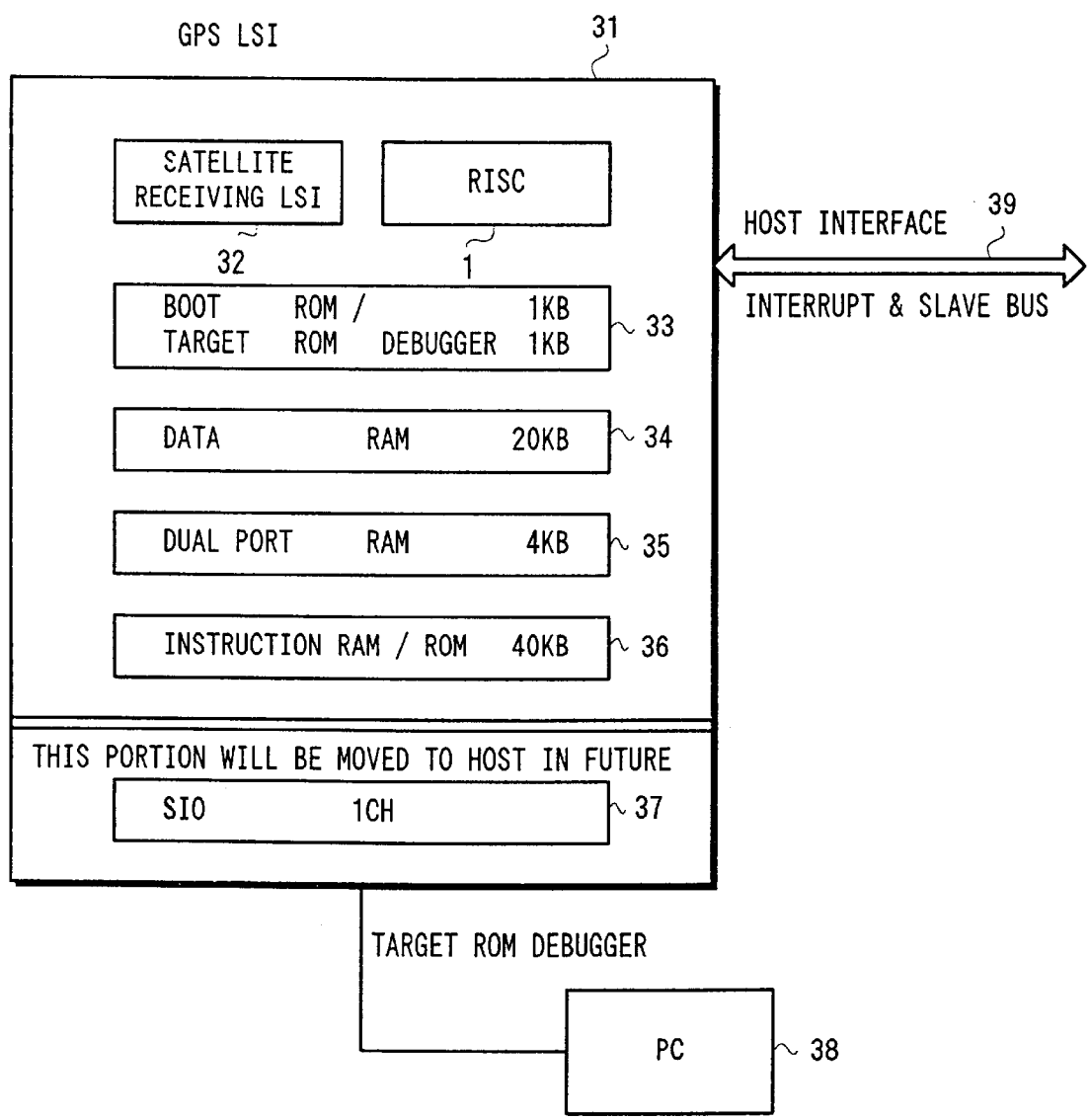
FIG. 11 is a block diagram showing an example of the structure of a GPS-LSI.

FIG. 11 shows an example of the structure of a one-chip microcomputer for use with a GPS (Global Positioning System). The one-chip microcomputer has the above-described RISC type microprocessor, a satellite receiving LSI, a RAM, and a ROM that are integrated in one chip. A boot ROM/target ROM debugger 33 of the one-chip microcomputer (GPS_LSI) 31 is composed of a boot ROM and a target ROM debugger. The boot ROM stores a boot program that is executed when the power of the one-chip microcomputer is turned on. The target ROM debugger stores a debugger program that is used to perform a debugging operation.

A data RAM 34 stores various types of data necessary for executing various processes. A dual port RAM 35 stores data received from a host computer (not shown) through a bus 39. In addition, the dual port RAM 35 stores data to be sent to the host computer. An instruction RAM/ROM 36 stores particular application programs, control programs, and so forth. By connecting a PC (Personal Computer) 38 to an SIO (Serial Input/Output) 37, programs stored in the instruction RAM/ROM 36 can be debugged.

Figure 12:
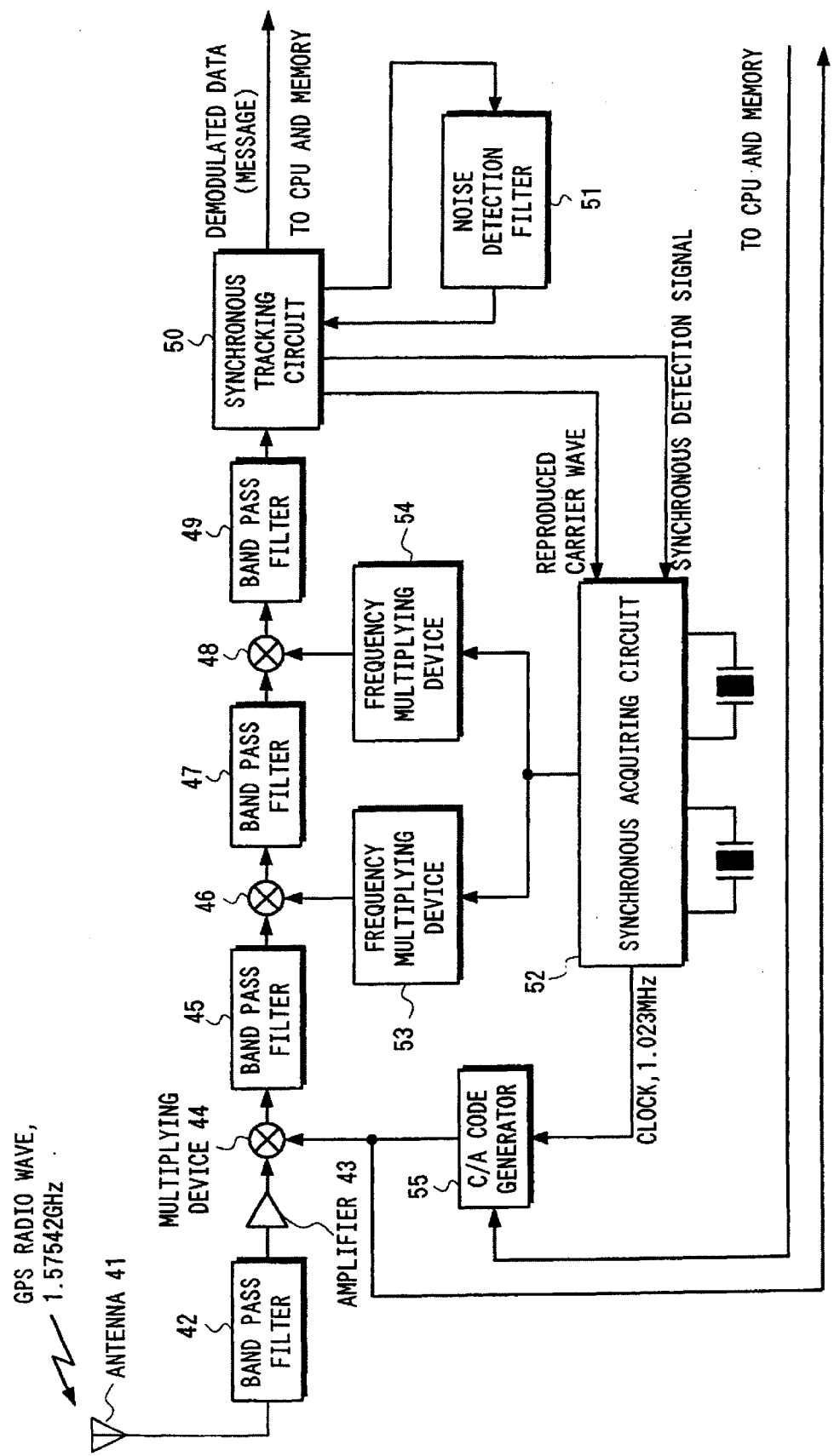
FIG. 12 is a block diagram showing an example of the structure of a GPS receiving system.

FIG. 12 shows an example of the structure of a GPS receiving system as an application of the information processing apparatus according to the present invention. An antenna 41 receives a radio wave from a GPS satellite (not shown) and supplies a signal of the radio wave to a band pass filter 42. The band pass filter 42 passes only a predetermined frequency of the input signal. An amplifier 43 amplifies the output signal of the band pass filter 42 and supplies the resultant signal to a multiplying device 46.

The multiplying device 44 multiplies the output signal of the amplifier 43 by a C/A code supplied from a C/A (Clear and Acquisition) code generator 55 and supplies the resultant signal to a band pass filter 45. The band pass filter 45 passes only a predetermined frequency of the output signal of the multiplying device 44. A multiplying device 46 multiplies the output signal of the band pass filter 45 by the output signal of a frequency multiplying device 53 (that will be described later) and supplies the resultant signal to a band pass filter 47. The band pass filter 47 passes only a predetermined frequency of the output signal of the multiplying device 46. A multiplying device 48 multiplies the output signal of the band pass filter 47 by the output signal of a frequency multiplying device 54 (that will be described later). A band pass filter 49 passes only a predetermined frequency of the output signal of the multiplying device 48.

A synchronous tracking circuit 50 is composed of a PLL or the like. The synchronous tracking circuit 50 detects synchronization and outputs a synchronous detection signal and a reproduced carrier wave. A noise detection filter 51 detects and removes noise contained in the input signal. A synchronous acquiring circuit 52 generates a clock signal corresponding to the synchronous detection signal and the reproduced carrier wave and supplies the clock to the C/A code generator 55. The frequency multiplying devices 53 and 54 extract higher harmonics of the input signals, amplify the extracted higher harmonics, and supply the resultant signals to the multiplying devices 46 and 48, respectively. The C/A code generator 55 generates a C/A code (namely, PN (Pseudo-Noise) code) in synchronization with the clock signal supplied from the synchronous acquiring circuit 52.

Next, the operation of the GPS receiving system will be described. The GPS radio wave transmitted from the GPS satellite is received by the antenna 41. The GPS radio wave is converted into a predetermined signal. The resultant signal is amplified by the amplifier 43 and then supplied to the multiplying device 44. The GPS satellite multiplies the carrier wave by the C/A code so as to spread spectrum. Thus, the receiving side should multiply the received signal by the same C/A code as that of the GPS satellite so as to obtain a narrow band signal. In other words, the multiplying device 44 multiplies the output signal of the amplifier 43 by the C/A code generated by the C/A code generator 55 and supplies the resultant signal to the band pass filter 45.

The band pass filter 45 passes only a predetermined frequency of the output signal of the multiplying device 44. The resultant signal is supplied to the multiplying device 46. The multiplying device 46 multiplies the output signal of the band pass filter 45 by the output signal of the frequency multiplying device 53 and supplies the resultant signal to the band pass filter 47. The band pass filter 47 passes only a predetermined frequency of the output signal of the multiplying device 46 and supplies the resultant signal to the multiplying device 48.

The multiplying device 48 multiplies the output signal of the band pass filter 47 by the output signal of the frequency multiplying device 54 and supplies the resultant signal to the band pass filter 49. The band pass filter 49 passes only a predetermined frequency of the output signal of the multiplying device 48 and supplies the resultant signal to the synchronous tracking circuit 50. The output signal of the synchronous tracking circuit 50 is supplied to the noise detection filter 50. The noise detection filter 50 removes noise contained in the output signal of the synchronous tracking circuit 50. The resultant signal is supplied to the synchronous tracking circuit 50 once again. The synchronous tracking circuit 50 tracks the synchronization of the output signal of the input signal and outputs the synchronous detection signal and the reproduced carrier wave.

The synchronous detection signal and the reproduced carrier wave that are output from the synchronous tracking circuit 50 are supplied to the synchronous acquiring circuit 52. The synchronous acquiring circuit 52 generates a clock signal with a predetermined frequency corresponding to the synchronous detection signal and the reproduced carrier wave supplied from the synchronous tracking circuit 50 and supplies the clock signal to the C/A code generator 55. The C/A code generator 55 generates the C/A code in synchronization with the clock signal and supplies the C/A code to the multiplying device 44. At this point, the phase of the C/A code supplied from the C/A code generator 55 is slightly shifted so that the phase of the C/A code accords with the phase of the received signal.

In such a manner, the received signal is converted into a base band signal and demodulated data is obtained. The demodulated data is supplied from the synchronous tracking circuit 50 to the CPU (not shown).

The above-described GPS receiving system can be structured with one chip. The chip can be used as the satellite receiving LSI 32 shown in FIG. 11.

In this case, the signal received from the GPS satellite to the satellite receiving LSI 32 is supplied to the RISC 1. The RISC 1 executes predetermined arithmetic operations corresponding to the signal supplied from the satellite receiving LSI 32 at high speed and measures the present location of the GPS receiving system. Thereafter, the RISC 1 reads map information corresponding to the present location from a CD-ROM or the like, converts the map information into picture data, and displays a map corresponding to the picture data on a CRT (not shown). In addition, the RISC 1 can perform two-dimensional or three-dimensional code conversion for the picture data corresponding to the traveling direction of the GPS receiving system or a user's operation. Moreover, when the GPS receiving system approaches an intersection, the RISC 1 can synthesize a particular sound signal and output it at a proper timing.

As described above, when the RISC 1 and the satellite receiving LSI 32 are integrated in one chip, a navigation system can be accomplished with one chip. In addition, with the one-chip structure, the cost of the system can be reduced. Moreover, the power consumption of the system can be suppressed.

In the above-described embodiment, the number of stages of the pipeline is five. However, the number of stages of the pipeline is not limited to five.

In the above-described embodiment, the instruction length is 16 bits fixed. However, another fixed bit length may be used.

In the above-described embodiment, when an instruction of the RISC 1 is used as a microcode, the number of bits newly added is four. However, any number of bits may be added.

In the above-described embodiment, an example of the structure of the one-chip microcomputer using the RISC processor that can be used in the GPS receiving system is shown. However, the present invention is not limited to the GPS receiving system. Instead, the present invention can be applied for a game machine, a portable information communication unit, a multimedia unit such as a KARAOKE unit, and other types of units.

In the RISC type microprocessor of claim 1, a predetermined fixed-length instruction is decoded by a decoding means. Thus, the decoding process for an instruction can be performed at high speed. Consequently, the arithmetic operations can be performed at high speed.

In the RISC type microprocessor of claim 6, a first mode for cyclically executing processes corresponding to a plurality of interrupts at predetermined intervals or a second mode for successively executing the processes corresponding to the interrupts is allocated by a mode allocating means. The interrupt process is controlled by an interrupt controlling means corresponding to the mode allocated by the mode allocating means. Thus, the interrupt process can be effectively executed. Consequently, the RISC type microprocessor can be used for a controller.

In the RISC type microprocessor of claim 8, a transferring means is provided independently from a data bus of the RISC type microprocessor. The transferring means is dedicatedly used by the coprocessor and adapted for transferring data. Thus, the coprocessor can transfer data independently from the RISC type microprocessor. Consequently, the coprocessor can be released from the critical path.

In the RISC type microprocessor of claim 9, a receiving unit that receives the radio wave from a GPS satellite and a RISC type microprocessor that processes the signal corresponding to the radio wave are integrated in one chip. Thus, the size of the apparatus can be reduced. Consequently, the power consumption can be reduced.

Having described specific preferred embodiments of the present invention with reference to the accompanying drawings, it is to be understood that the invention is not limited to those precise embodimenta, and that various changes and modifications may be effected therein by one skilled in the art without departing from the scope or the spirit of the invention as defined in the appended claims.

What is claimed is:

1. A one-chip microcomputer, comprising:

a RISC type microprocessor, said RISC type microprocessor being a pipeline processor and including a bypass circuit for generating a flag corresponding to a result of a comparison instruction so that the result of the comparison instruction is available for use in the same pipeline cycle in which the comparison instruction was executed;

a data bus of said RISC type microprocessor;

a coprocessor having a plurality of general purpose registers and a plurality of dedicated control registers, wherein one or more of said control registers are mapped as internal registers for said RISC type processor; and transferring means provided independently from said data bus of the RISC type microprocessor, dedicatedly used by the coprocessor, and adapted for transferring data between a shared system memory and said coprocessor independent of said RISC type microprocessor.

* * * * *